United States Patent
Sakai

(10) Patent No.: US 12,418,622 B2
(45) Date of Patent: Sep. 16, 2025

(54) IMAGE PROCESSING APPARATUS CAPABLE OF GENERATING COLOR-REDUCED IMAGE WITH HIGH OBJECT REPRODUCIBILITY, CONTROL METHOD FOR IMAGE PROCESSING APPARATUS, AND STORAGE MEDIUM

(71) Applicant: CANON KABUSHIKI KAISHA, Tokyo (JP)

(72) Inventor: Hiroyuki Sakai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 18/366,935

(22) Filed: Aug. 8, 2023

(65) Prior Publication Data
US 2024/0064262 A1    Feb. 22, 2024

(30) Foreign Application Priority Data
Aug. 22, 2022  (JP) ................................ 2022-131969

(51) Int. Cl.
| G06T 5/40 | (2006.01) |
| G06T 7/11 | (2017.01) |
| G06T 7/90 | (2017.01) |
| G06V 10/56 | (2022.01) |
| H04N 1/60 | (2006.01) |

(52) U.S. Cl.
CPC ............. *H04N 1/6058* (2013.01); *G06T 5/40* (2013.01); *G06T 7/11* (2017.01); *G06T 7/90* (2017.01); *G06V 10/56* (2022.01); *H04N 1/6008* (2013.01); *G06T 2207/10024* (2013.01)

(58) Field of Classification Search
CPC ......... H04N 1/6058; G06V 10/56; G06T 5/40
See application file for complete search history.

(56) References Cited

U.S. PATENT DOCUMENTS

| 8,768,051 B2 * | 7/2014 | Yamazaki | ............... | H04N 1/642 |
| | | | | 382/165 |
| 11,283,963 B2 * | 3/2022 | Muraishi | ................ | H04N 1/387 |

(Continued)

FOREIGN PATENT DOCUMENTS

JP    2003309727 A    10/2003

*Primary Examiner* — Edward Park
(74) *Attorney, Agent, or Firm* — ROSSI, KIMMS & McDOWELL LLP

(57) ABSTRACT

An image processing apparatus capable of generating a color-reduced image with high object reproducibility is provided. The image processing apparatus includes a data processing unit configured or programmed to function as a generating unit generating a binary image for judging whether each of pixels constituting an image obtained is a background attribute or a character attribute, a first determining unit determining a first type representative color based on a histogram of RGB values of pixels judged to be the background attribute based on the binary image among all the pixels constituting the image, a second determining unit determining a second type representative color based on a histogram of RGB values of pixels judged to be the character attribute based on the binary image among all the pixels constituting the image, and a processing unit performing a color reduction processing on the image to generate a color-reduced image.

10 Claims, 11 Drawing Sheets

(56) References Cited

U.S. PATENT DOCUMENTS

| | | | | |
|---|---|---|---|---|
| 2010/0246942 A1* | 9/2010 | Adachi | ............... | H04N 1/644 |
| | | | | 382/164 |
| 2020/0084337 A1* | 3/2020 | Muraishi | ............... | H04N 19/25 |
| 2021/0303905 A1* | 9/2021 | Baek | ............... | G06V 30/153 |
| 2024/0064262 A1* | 2/2024 | Sakai | ............... | H04N 1/6058 |

* cited by examiner

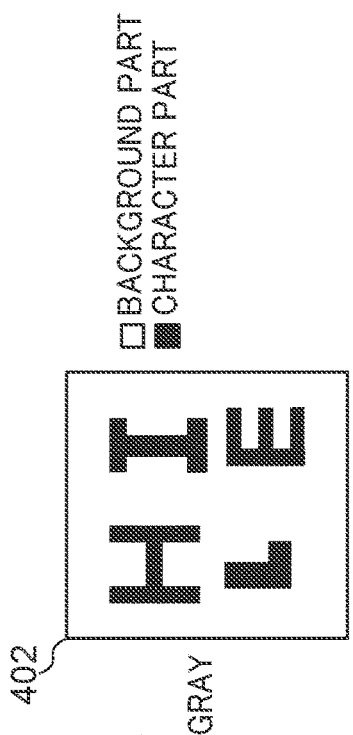
FIG. 4A
FIG. 4B
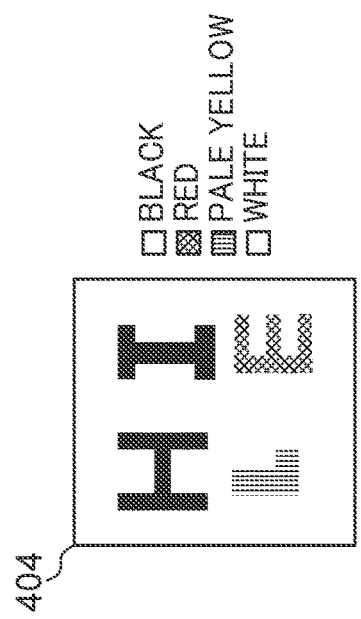
FIG. 4C
FIG. 4E
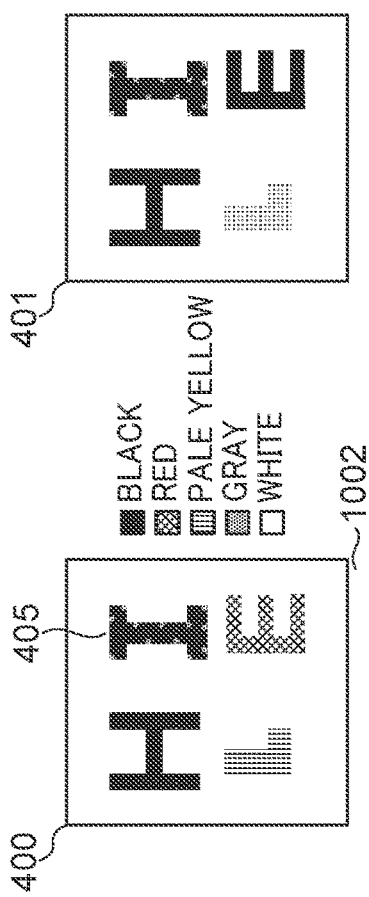
FIG. 4D

| COLOR | START COORDINATES | END COORDINATES | NUMBER-OF-PIXELS |
|---|---|---|---|
| WHITE | (X1, Y1) | (X2, Y2) | 1000 |
| BLACK | (X3, Y3) | (X4, Y4) | 400 |
| PALE YELLOW | (X5, Y5) | (X6, Y6) | 150 |
| RED | (X7, Y7) | (X8, Y8) | 200 |

| COLOR | START COORDINATES | END COORDINATES | NUMBER-OF-PIXELS |
|---|---|---|---|
| WHITE | (X1, Y1) | (X2, Y2) | 1000 |
| BLACK | (X3, Y3) | (X4, Y4) | 400 |
| RED | (X7, Y7) | (X8, Y8) | 200 |
| PALE YELLOW | (X5, Y5) | (X6, Y6) | 150 |

*FIG. 8A*
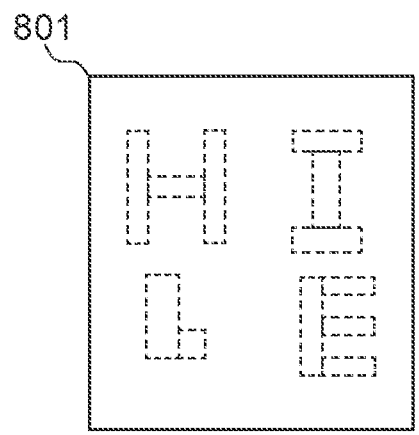
*FIG. 8B*
| ATTRIBUTE | REPRESENTATIVE COLOR (RGB) |
|---|---|
| BACKGROUND | (255, 255, 255) |
*FIG. 8C*
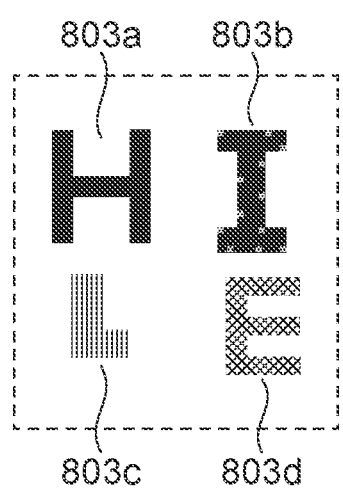
*FIG. 8D*
| ATTRIBUTE | REPRESENTATIVE COLOR (RGB) |
|---|---|
| CHARACTER | (255, 255, 200) |
| CHARACTER | (255, 0, 0) |
| CHARACTER | (0, 0, 0) |

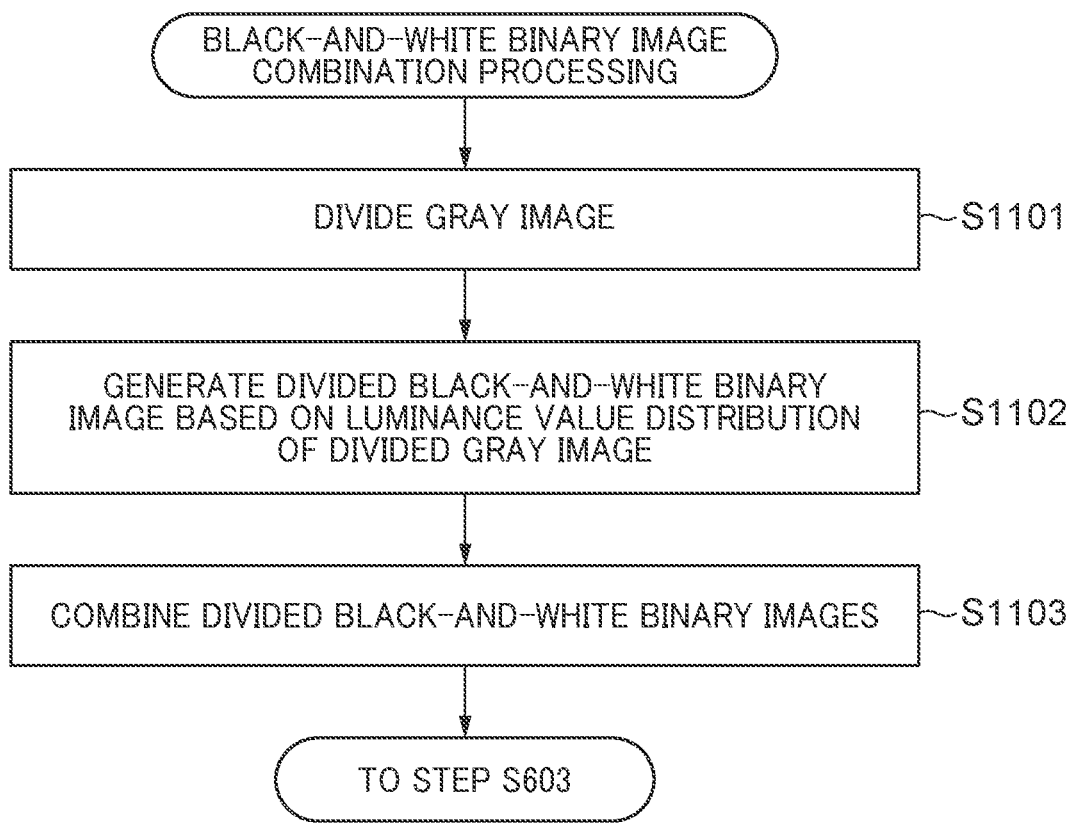

IMAGE PROCESSING APPARATUS CAPABLE OF GENERATING COLOR-REDUCED IMAGE WITH HIGH OBJECT REPRODUCIBILITY, CONTROL METHOD FOR IMAGE PROCESSING APPARATUS, AND STORAGE MEDIUM

BACKGROUND OF THE INVENTION

Field of the Invention

The present invention relates to an image processing apparatus, a control method for the image processing apparatus, and a storage medium.

DESCRIPTION OF THE RELATED ART

In recent years, with the spread of color printers and color scanners, the number of documents in color has increased, and there is an increasing number of occasions where such documents in color are scanned, captured, stored as electronic files, and transmitted via the Internet or the like. However, full-color data has a large data size, which puts pressure on a storage area of a storage device and places a heavy load on a communication line. Therefore, it is necessary to reduce the data size in some way.

As a method of compressing a color image, there are a compression method of compressing the color image into a binary image with pseudo gradation by error diffusion, etc., a compression method of compressing the color image in joint photographic experts group (JPEG) format, a compression method of performing ZIP compression or LZW compression after converting into palette colors such as 8-bit color, etc.

In Japanese Laid-Open Patent Publication (kokai) No. 2003-309727, a color reduction processing is performed with respect to an original image, color information and an index color image are outputted, a binary image for each color and background color information are generated, and a compression processing is performed by using a method such as modified modified read (MMR) system.

The method disclosed in Japanese Laid-Open Patent Publication (kokai) No. 2003-309727 achieves compression with higher compression efficiency and higher reproducibility than the various kinds of compression methods described above.

When scanning a paper document, objects with uneven shading such as handwritten characters will have variations in luminance values. In the case that the color reduction processing disclosed in Japanese Laid-Open Patent Publication (kokai) No. 2003-309727 is executed with respect to such an image, for example, some pixels in a handwritten character area will be color-reduced to the background color, and a color-reduced image with blurred characters will be generated, in other words, a color-reduced image with low object reproducibility will be generated.

SUMMARY OF THE INVENTION

The present invention provides an image processing apparatus capable of generating a color-reduced image with high object reproducibility, a control method for the image processing apparatus, and a storage medium.

Accordingly, the present invention provides an image processing apparatus comprising a data processing unit configured or programmed to function as a generating unit that generates a binary image for judging whether each of pixels constituting an image obtained is a background attribute or a character attribute, a first determining unit that determines one or more colors of a first type representative color based on a histogram of RGB values of pixels judged to be the background attribute based on the binary image among all the pixels constituting the image, a second determining unit that determines one or more colors of a second type representative color based on a histogram of RGB values of pixels judged to be the character attribute based on the binary image among all the pixels constituting the image, and a color reduction processing unit that performs a color reduction processing with respect to the image to generate a color-reduced image. In the color reduction processing, the RGB values of the pixels judged to be the background attribute based on the binary image among all the pixels constituting the image are converted into RGB values indicating the first type representative color, and the RGB values of the pixels judged to be the character attribute based on the binary image among all the pixels constituting the image are converted into RGB values indicating the second type representative color.

According to the present invention, it is possible to generate the color-reduced image with high object reproducibility.

Further features of the present invention will become apparent from the following description of exemplary embodiments with reference to the attached drawings.

BRIEF DESCRIPTION OF THE DRAWINGS

FIGS. 4A, 4B, 4C, 4D, and 4E are diagrams that show an example of data generated in the data processing unit of FIG. 2.

FIGS. 8A, 8B, 8C, and 8D are diagrams for explaining conversion of RGB values of a pixel of interest in the preferred embodiment of the present invention.

FIG. 11 is a flowchart that shows another procedure of a black-and-white binary image generating processing executed in a step S602 of FIG. 6.

DESCRIPTION OF THE EMBODIMENTS

The present invention will now be described in detail below with reference to the accompanying drawings showing embodiments thereof.

Figure 1:
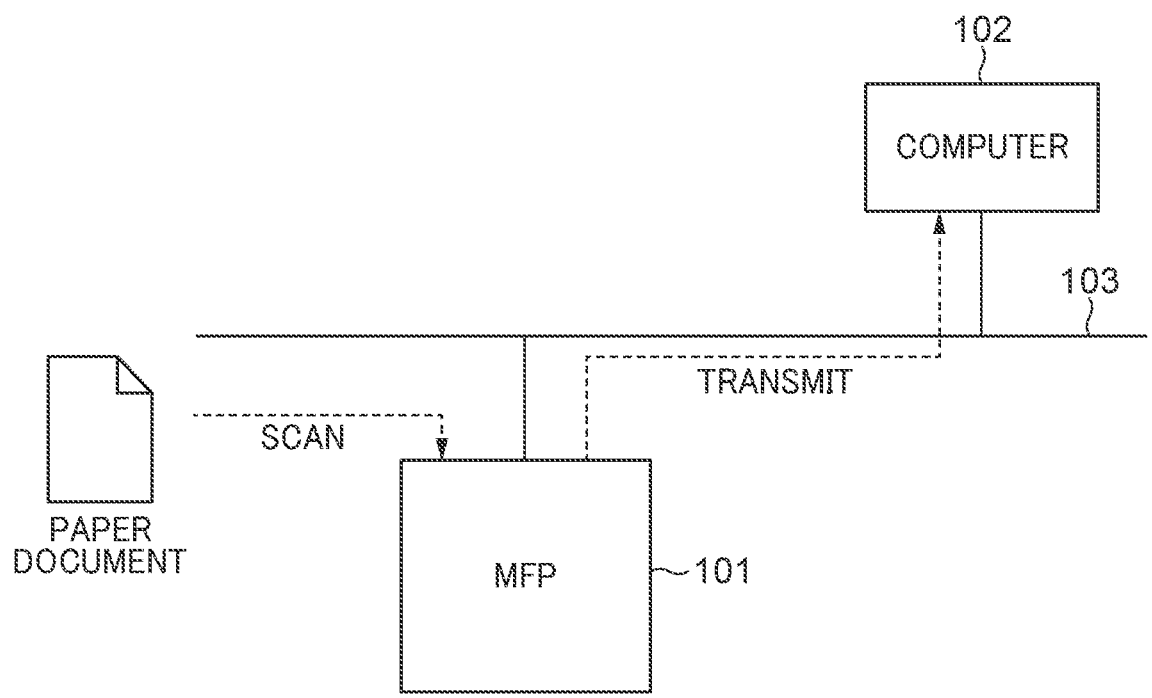
FIG. 1 is a configuration diagram that schematically shows a configuration of a system including a multifunction peripheral (an MFP) functioning as an image processing apparatus according to a preferred embodiment of the present invention.

FIG. 1 is a configuration diagram that schematically shows a configuration of a system including a multifunction peripheral (an MFP) 101 functioning as an image processing apparatus according to a preferred embodiment of the present invention. As shown in FIG. 1, the system includes the MFP 101 and a computer (hereinafter, referred to as "a PC") 102. The MFP 101 is connected to the PC 102 via a network 103.

Figure 2:
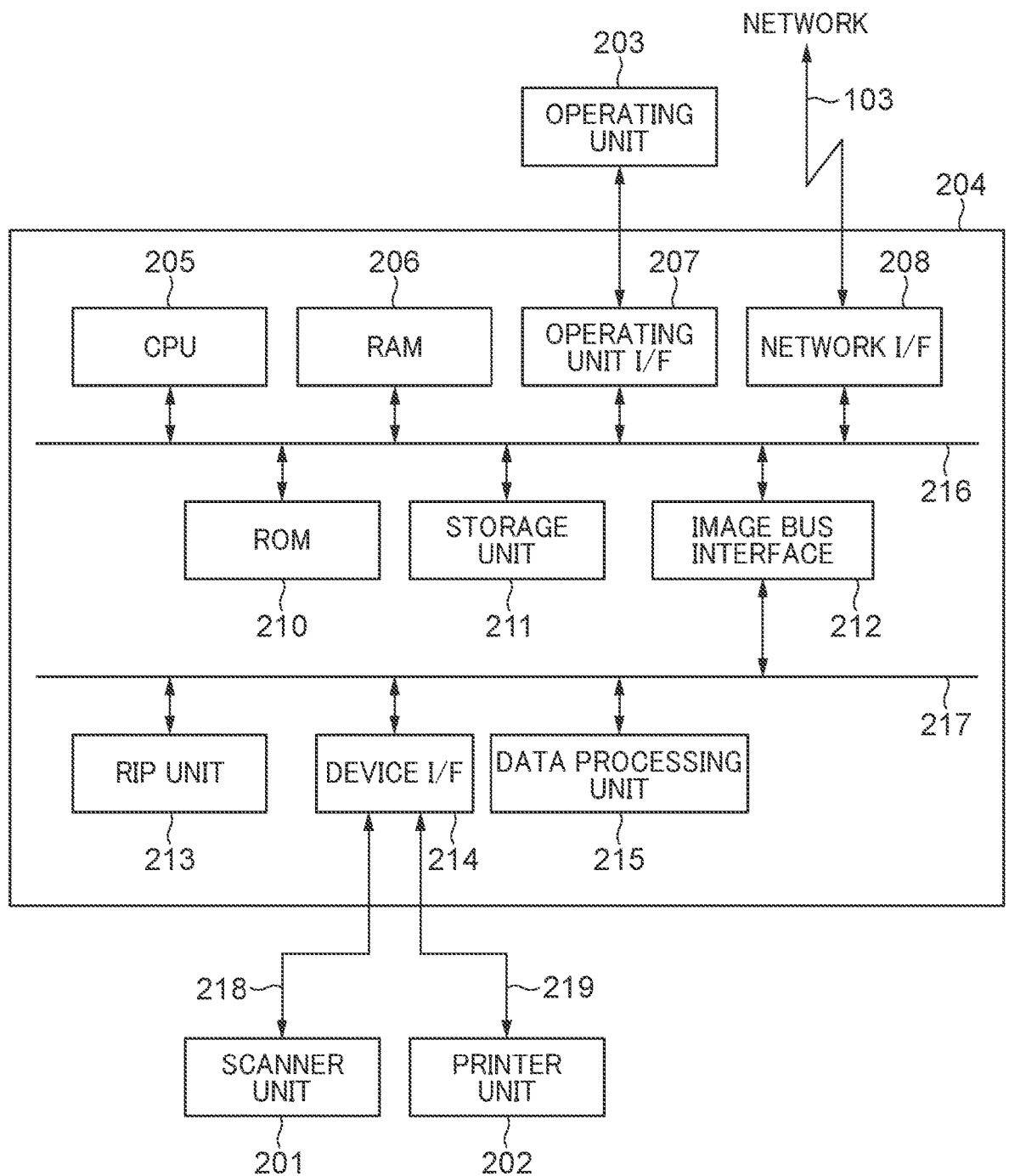
FIG. 2 is a block diagram that schematically shows a configuration of the MFP of FIG. 1.

By using an operating unit 203, which is included in the MFP 101, is shown in FIG. 2, and will be described below, a user is able to perform scan settings and set a transmission destination (for example, the PC 102) of a scanned image obtained by a scanning processing. As the scan settings, for example, the user is able to designate a resolution, a compression rate, a data format (for example, JPEG, TIFF, PDF, or small-number-of-colors compression), etc. In the preferred embodiment of the present invention, a case where the small-number-of-colors compression is designated as the data format will be described. Moreover, the details of the small-number-of-colors compression will be described below. The MFP 101 reads a document based on the scan settings designated by the user, generates a scanned image, compresses the scanned image into a designated data format, and transmits the compressed data to a designated transmission destination such as the PC 102. The PC 102 uses a general-purpose viewer to display the scanned image corresponding to the received data.

FIG. 2 is a block diagram that schematically shows a configuration of the MFP 101 of FIG. 1. As shown in FIG. 2, the MFP 101 includes a scanner unit 201 that is an image input device, a printer unit 202 that is an image output device, a control unit 204, the operating unit 203 that is a user interface, etc. The control unit 204 is connected to the scanner unit 201, the printer unit 202, and the operating unit 203. In addition, the control unit 204 includes a central processing unit (CPU) 205, a random access memory (RAM) 206, an operating unit interface (I/F) 207, a network I/F 208, a read only memory (ROM) 210, a storage unit 211, a raster image processor (RIP) unit 213, a device I/F 214, and a data processing unit 215.

The control unit 204 functions as a controller that performs input/output of image information and device information by being connected to the network 103 via the network I/F 208.

The CPU 205 is a processor that controls the entire system. The RAM 206 is a system working memory for the CPU 205 to work, and is also an image memory for temporarily storing image data. The ROM 210 is a boot ROM and stores a boot program, etc. of the system. The storage unit 211 is a hard disk drive and stores system control software, the image data, etc.

The operating unit I/F 207 is an interface unit for connecting the operating unit 203 to the control unit 204. The operating unit I/F 207 outputs image data for display on the operating unit 203 to the operating unit 203. In addition, the operating unit I/F 207 obtains information, which is inputted into the operating unit 203 by the user, from the operating unit 203, and transfers the obtained information to the CPU 205. The network I/F 208 connects the MFP 101 to the network 103 and performs input/output of information in packet format. In the control unit 204, the CPU 205, the RAM 206, the operating unit I/F 207, the network I/F 208, the ROM 210, and the storage unit 211 are arranged on a system bus 216.

An image bus interface 212 is a bus bridge that connects the system bus 216 and an image bus 217, which transfers image data at high speed, and converts the data structure.

The image bus 217 is configured by, for example, a peripheral component interconnect (PCI) bus or an IEEE1394 bus. The RIP unit 213, the device I/F 214, and the data processing unit 215 are arranged on the image bus 217.

The RIP unit 213 executes a so-called rendering processing that analyzes page description language (PDL) codes and develops them into a bitmap image with a designated resolution. The device I/F 214 is connected via a signal line 218 to the scanner unit 201 that is the image input device. In addition, the device I/F 214 is connected via a signal line 219 to the printer unit 202 that is the image output device.

Figure 3:
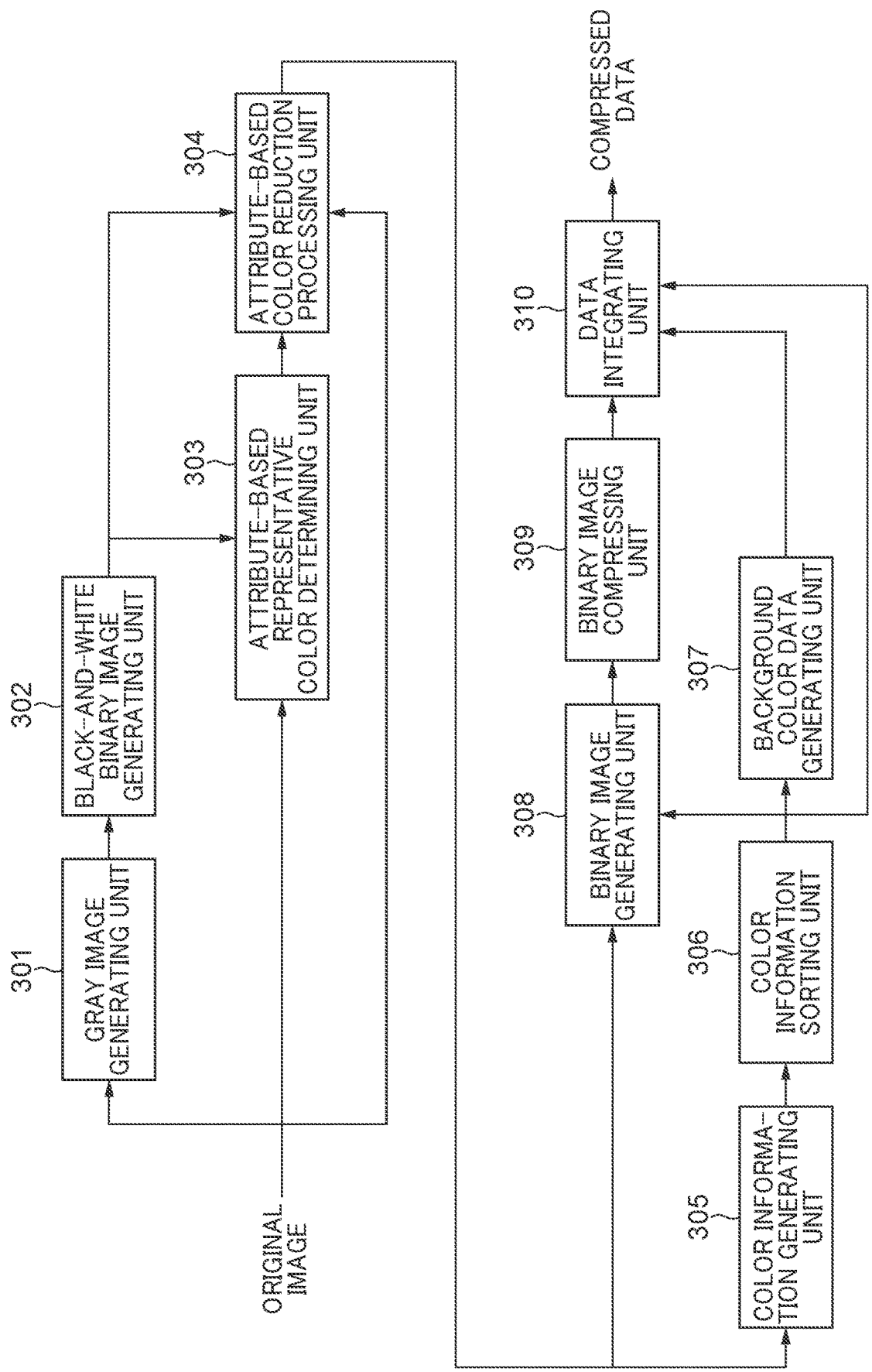
FIG. 3 is a block diagram that schematically shows a configuration of a data processing unit of FIG. 2.

The data processing unit 215 is implemented by, for example, an application specific integrated circuit (ASIC). The data processing unit 215 performs image processing with respect to the scanned image generated by the scanner unit 201 and the image data to be outputted to the printer unit 202. In addition, the data processing unit 215 performs processing such as the small-number-of-colors compression and optical character recognition (OCR). As a result, compressed data 901 shown in FIG. 9, which will be described below, is generated. The generated compressed data 901 is transmitted to the designated transmission destination, for example, the PC 102 via the network I/F 208 and the network 103. In addition, the data processing unit 215 is also able to perform a decompression processing with respect to the compressed data received via the network I/F 208 and the network 103. The image data obtained by the decompression processing is transferred to the printer unit 202 via the device I/F 214. The printer unit 202 performs a print processing of the obtained image data. FIG. 3 is a block diagram that schematically shows a configuration of the data processing unit 215 of FIG. 2. As shown in FIG. 3, the data processing unit 215 includes a gray image generating unit 301, a black-and-white binary image generating unit 302, an attribute-based representative color determining unit 303, an attribute-based color reduction processing unit 304, a color information generating unit 305, and a color information sorting unit 306. The data processing unit 215 further includes a background color data generating unit 307, a binary image generating unit 308, a binary image compressing unit 309, and a data integrating unit 310. The processing of the modules shown in FIG. 3 is executed by the data processing unit 215 in accordance with instructions received from the CPU 205.

The gray image generating unit 301 performs a gray image generating processing (a processing that generates a gray image) based on signal values of an original image 400 that is shown in FIG. 4A and is obtained from the scanner unit 201 by the data processing unit 215. The original image 400 is a scanned image generated by reading a document, in which characters, figures, etc. are drawn in a plurality of colors, by the scanner unit 201. For example, the original image 400 is configured by a plurality of colors that are black, red, pale yellow, gray, and white. In the gray image generating processing, for example, RGB values of the original image 400 are synthesized at a ratio of 3:6:1. It should be noted that this method is only an example, and the gray image may be generated by other methods. A gray image 401 shown in FIG. 4B is generated by the gray image generating processing. The gray image 401 is a grayscale 8-bit image having the same size as the original image 400, and for example, is configured by colors that are black, gray, light gray, and white.

The black-and-white binary image generating unit 302 performs a black-and-white binary image generating processing (a processing that generates a black-and-white binary image) based on signal values of the gray image 401.

In the black-and-white binary image generating processing, a binarization method using a distribution of luminance values of the gray image 401 is used instead of a binarization method using a fixed value. By performing a color reduction processing, which will be described below, by using the black-and-white binary image generated by such a binarization method (the binarization method using the distribution of the luminance values of the gray image 401), it becomes possible to improve the reproducibility of the shape of the object. Moreover, as a binarization method, although it is possible to use an error diffusion method, when considering the compression efficiency of the binary image compressing unit 309, which will be described below, this binarization method is not suitable for the preferred embodiment of the present invention. Therefore, in the preferred embodiment of the present invention, "Otsu's binarization" is used as the binarization method. A black-and-white binary image 402 shown in FIG. 4C is generated by the black-and-white binary image generating unit 302. The black-and-white binary image 402 is, for example, a 1-bit image having the same size as the original image 400. A pixel value of each pixel constituting the black-and-white binary image 402 becomes "0" indicating black or "1" indicating white based on the signal values of the gray image 401. In the preferred embodiment of the present invention, the black-and-white binary image 402 is used to judge whether each pixel constituting the original image 400 is a background attribute or a character attribute. For example, among a plurality of pixels constituting the original image 400, pixels, which have the same coordinates as pixels with a pixel value of "1" in the black-and-white binary image 402, are judged to be the background attribute. On the other hand, among the plurality of pixels constituting the original image 400, pixels, which have the same coordinates as pixels with a pixel value of "0" in the black-and-white binary image 402, are judged to be the character attribute.

The attribute-based representative color determining unit 303 generates attribute-based representative color information 403, which is used in the color reduction processing performed by the attribute-based color reduction processing unit 304. In the color reduction processing, a color-reduced image, in which the number of colors used in the original image has been reduced to a predetermined number, is generated. It should be noted that in the preferred embodiment of the present invention, as an example, although the predetermined number is set to 4, the predetermined number is not limited to 4, and may be a number greater than or equal to 3 and less than the number of colors used in the original image. For example, information indicating the predetermined number is stored in the ROM 210 in advance. The attribute-based representative color information 403 includes RGB values of colors after color reduction (hereinafter, referred to as "representative colors").

As a histogram of RGB values of the background attribute, the attribute-based representative color determining unit 303 generates a histogram of RGB values of the pixels, which have the same coordinates as the pixels with the pixel value of "1" in the black-and-white binary image 402, among the plurality of pixels constituting the original image 400. In addition, as a histogram of RGB values of the character attribute, the attribute-based representative color determining unit 303 generates a histogram of RGB values of the pixels, which have the same coordinates as the pixels with the pixel value of "0" in the black-and-white binary image 402, among the plurality of pixels constituting the original image 400. The attribute-based representative color determining unit 303 determines the representative colors by selecting the predetermined number of colors with high frequencies in the generated histograms. In the preferred embodiment of the present invention, as an example, a case will be described in which one color with the highest frequency is determined from the histogram of the RGB values of the background attribute, and three colors are determined in descending order of frequency from the histogram of the RGB values of the character attribute. It should be noted that the method of determining the representative colors is not limited to this. As RGB values of the representative color of the background attribute, the attribute-based representative color determining unit 303, which functions as a first determining unit, sets RGB values of the one color determined from the histogram of the RGB values of the background attribute in the attribute-based representative color information 403. In addition, as RGB values of the representative color of the character attribute, the attribute-based representative color determining unit 303, which functions as a second determining unit, sets RGB values of the three colors determined from the histogram of the RGB values of the character attribute in the attribute-based representative color information 403.

The attribute-based color reduction processing unit 304 performs the color reduction processing with respect to the original image 400 by using the black-and-white binary image 402 and the attribute-based representative color information 403. It should be noted that the details of the color reduction processing will be described below. By the color reduction processing performed by the attribute-based color reduction processing unit 304, a color-reduced image 404 shown in FIG. 4E, in which the original image 400 has been reduced to four colors, is generated.

Figures 5A, 5B, 5C:
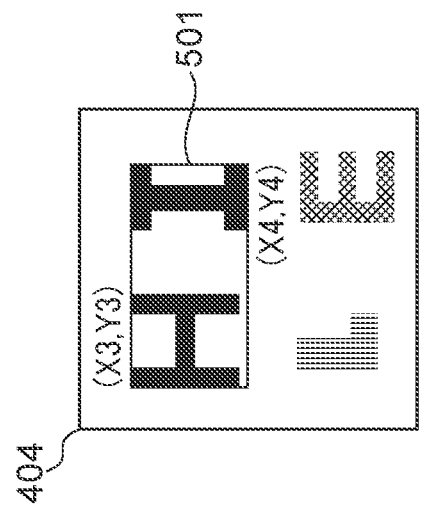
FIGS. 5A, 5B, and 5C are diagrams for explaining operations of a color information generating unit and a color information sorting unit that are shown in FIG. 3.

The color information generating unit 305 generates color management information 500 shown in FIG. 5A. The color management information 500 includes a plurality of pieces of color information corresponding to respective colors included in the color-reduced image 404. The color information includes coordinate information indicating that pixels having a pixel value indicating a corresponding color exist in which range of the color-reduced image 404, and information indicating the number of the pixels having the pixel value indicating the corresponding color. As an example, among the plurality of pieces of color information included in the color management information 500, the color information of "black" will be described. As the coordinate information corresponding to "black", the color information of "black" includes information, in which coordinates of a pixel in the upper left corner of a region 501 shown in FIG. 5B including all pixels having a pixel value indicating "black" in the color-reduced image 404 are set as start coordinates, and coordinates of a pixel in the lower right corner of the region 501 are set as end coordinates. In addition, the color information of "black" includes "400" indicating the total number of the pixels having the pixel value indicating "black" in the color-reduced image 404.

The color information sorting unit 306 sorts the plurality of pieces of color information included in the color management information 500 based on the number of pixels. As a result, sorted color management information 502 shown in FIG. 5C is generated. In the sorted color management information 502, the color information corresponding to a color with the largest number of pixels is arranged at the top (that is, the color information corresponding to the color with the largest number of pixels has the top-most arrangement order). In FIG. 5C, the color information of "white" is at the top of the sorted color management information 502.

The background color data generating unit 307 generates background color data based on the color information corresponding to the color having the top-most arrangement order in the sorted color management information 502. It should be noted that in the preferred embodiment of the present invention, the background color data is assumed to be respective 8-bit values of RGB, but is not limited to this.

The binary image generating unit 308 generates binary images based on the color-reduced image 404 and the sorted color management information 502. In the preferred embodiment of the present invention, binary images of three colors (for example, black, pale yellow, and red) excluding the color having the top-most arrangement order in the sorted color management information 502 (for example, white) are generated, respectively. As an example, the generation of the binary image of black will be described. The binary image generating unit 308 cuts out the region 501 indicated by the coordinate information in the color information of "black" from the color-reduced image 404. Next, the binary image generating unit 308 generates the binary image of black by setting the pixel values of the pixels having the pixel value indicating black in the region 501 to "1" and setting the pixel values of the pixels having the pixel values other than the pixel value indicating black in the region 501 to "0". In addition, the binary image generating unit 308 adds data indicating black to the binary image of black. Similarly, the binary image generating unit 308 generates the binary image of pale yellow and the binary image of red, respectively.

The binary image compressing unit 309 performs compression with respect to the three binary images (the binary image of black, the binary image of pale yellow, and the binary image of red) generated by the binary image generating unit 308, respectively, and generates three pieces of binary image compressed data. It should be noted that in the preferred embodiment of the present invention, although it is assumed that the MMR is used as the compression method, the compression method is not limited to this. The data integrating unit 310 integrates the background color data, the three pieces of binary image compressed data, and the sorted color management information 502 to generate compressed data. It should be noted that in the preferred embodiment of the present invention, although the case where the data processing unit 215 has a hardware configuration realized by the ASIC has been described, the present invention is not limited to this. For example, the data processing unit 215 may be a software module implemented by the CPU 205 executing programs stored in the ROM 210 or the like. In the case that the data processing unit 215 is the software module, the processing of each module shown in FIG. 3 is implemented by the CPU 205 executing the program stored in the ROM 210 or the like.

Next, the small-number-of-colors compression in the MFP 101 will be described.

When the user inputs a reading instruction, in which the small-number-of-colors compression is set as the data format, into the operating unit 203, the operating unit I/F 207 outputs a notification, which indicates that this reading instruction has been received, to the CPU 205. The CPU 205 outputs a document reading instruction to the scanner unit 201 based on the notification received from the operating unit I/F 207. The scanner unit 201 reads a document in accordance with the document reading instruction and generates a scanned image of the document. It should be noted that in the preferred embodiment of the present invention, as an example, it is assumed that the original image 400, which is a scanned image with 300 dpi (dots per inch) and respective 8-bit of RGB, is generated. The scanner unit 201 outputs the generated original image 400 to the data processing unit 215. The data processing unit 215 performs a small-number-of-colors compression processing shown in FIG. 6 based on the original image 400 received from the scanner unit 201.

Figure 6:
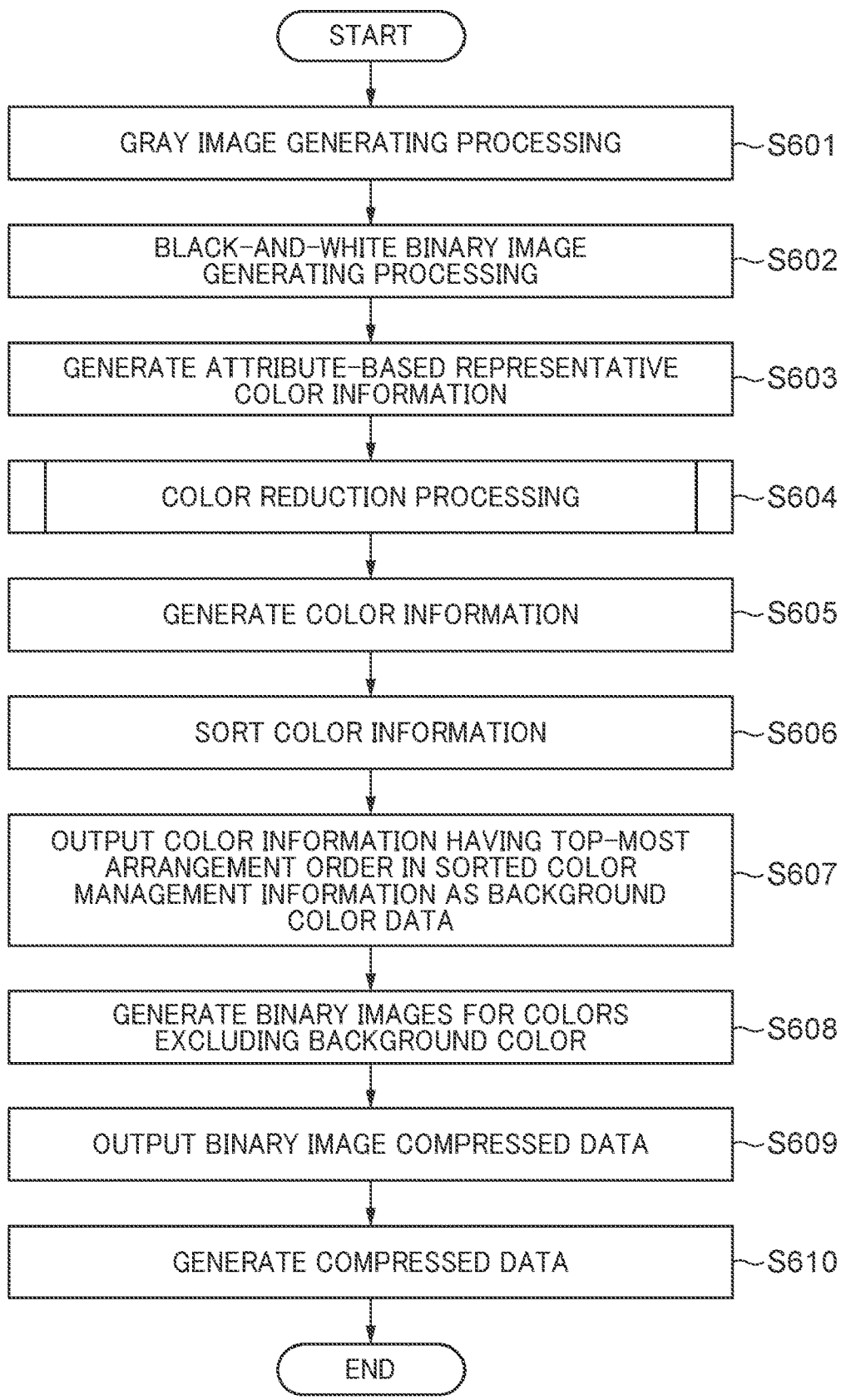
FIG. 6 is a flowchart that shows a procedure of a small-number-of-colors compression processing executed by the data processing unit of FIG. 2.

FIG. 6 is a flowchart that shows a procedure of the small-number-of-colors compression processing executed by the data processing unit 215 of FIG. 2. The small-number-of-colors compression processing shown in FIG. 6 is executed by the data processing unit 215 in accordance with the instruction received from the CPU 205.

As shown in FIG. 6, first, the data processing unit 215 controls the gray image generating unit 301 to perform the above-described gray image generating processing based on the signal values of the obtained original image 400 (a step S601). As a result, the gray image 401, which is the grayscale 8-bit image having the same size as the original image 400, is generated.

Next, the data processing unit 215 controls the black-and-white binary image generating unit 302 to perform the black-and-white binary image generating processing based on the signal values of the gray image 401 (a step S602). In the black-and-white binary image generating processing, as described above, the binarization method using the distribution of the luminance values of the gray image 401 is used. As a result, the black-and-white binary image 402, which is the black-and-white 2-bit image having the same size as the original image 400, is generated. Next, the data processing unit 215 controls the attribute-based representative color determining unit 303 to generate the attribute-based representative color information 403 based on the original image 400 and the black-and-white binary image 402 (a step S603). It should be noted that the method described above is used in the generation of the attribute-based representative color information 403. Next, the data processing unit 215 controls the attribute-based color reduction processing unit 304 to perform the color reduction processing shown in FIG. 7 based on the original image 400, the black-and-white binary image 402, and the attribute-based representative color information 403 (a step S604).

For example, in the case that a character region 405 in the original image 400 is a region corresponding to a handwritten character, since the density of the character region 405 is uneven, there may be pixels that become colors other than black when being scanned, even though the character region 405 is originally configured by only black. When the conventional color reduction processing is performed with respect to such the original image 400, depending on luminance values of the pixels that become the colors other than black, the character region 405 is not appropriately color-reduced, and character blurring, etc. occur.

Figure 7:
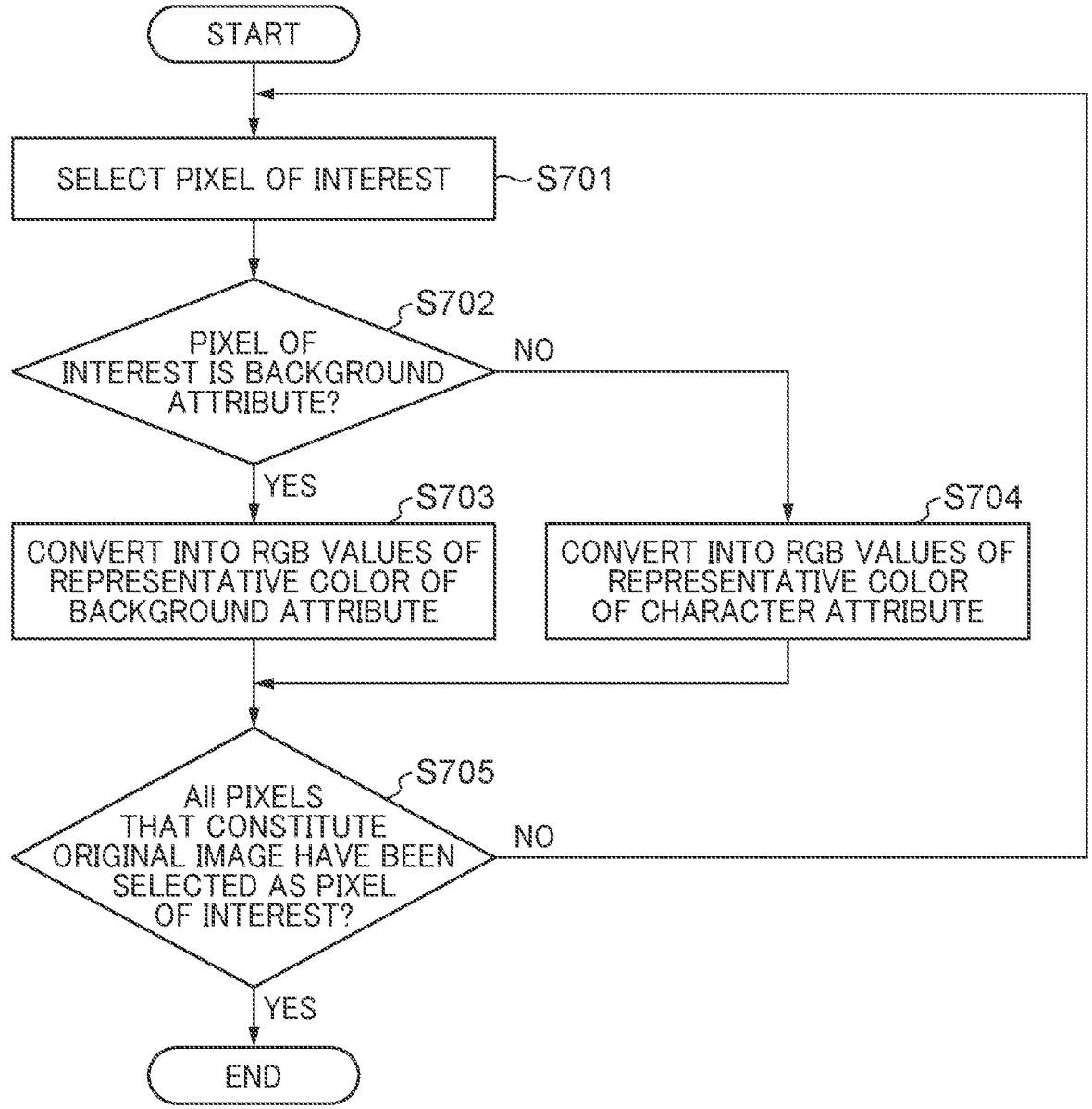
FIG. 7 is a flowchart that shows a procedure of a color reduction processing executed in a step S604 of FIG. 6.

On the other hand, in the preferred embodiment of the present invention, the color reduction processing is performed by using the original image 400, the black-and-white binary image 402 generated by using the distribution of the luminance values, and the attribute-based representative color information 403. FIG. 7 is a flowchart that shows a procedure of the color reduction processing executed in the step S604 of FIG. 6. The color reduction processing shown in FIG. 7 is executed by the attribute-based color reduction processing unit 304 of the data processing unit 215.

As shown in FIG. 7, the attribute-based color reduction processing unit 304 selects one pixel among the plurality of pixels constituting the original image 400 as a pixel of interest (a step S701). It should be noted that the order of selecting the pixel of interest may be any order, and in the preferred embodiment of the present invention, as an example, the pixel of interest is selected in the raster scanning order of the entire original image 400. Next, the attribute-based color reduction processing unit 304 judges whether or not the pixel of interest is the background attribute based on the black-and-white binary image 402 (a step S702). Specifically, the attribute-based color reduction processing unit 304 judges whether the pixel value of the pixel having the same coordinates as the pixel of interest among the pixels constituting the black-and-white binary image 402 is "0" or "1". In the case that the pixel value of the pixel having the same coordinates as the pixel of interest among the pixels constituting the black-and-white binary image 402 is "1", the attribute-based color reduction processing unit 304 judges that the pixel of interest is the background attribute, and the color reduction processing proceeds to a step S703. In the case that the pixel value of the pixel having the same coordinates as the pixel of interest among the pixels constituting the black-and-white binary image 402 is "0", the attribute-based color reduction processing unit 304 judges that the pixel of interest is not the background attribute, and the color reduction processing proceeds to a step S704.

In the step S703, the attribute-based color reduction processing unit 304 converts RGB values of the pixel of interest into RGB values indicating the color set in the attribute-based representative color information 403 as the representative color of the background attribute. In this way, in the preferred embodiment of the present invention, the pixels judged to be the background attribute based on the black-and-white binary image 402 among the plurality of pixels constituting the original image 400, for example, a pixel group 801 shown in FIG. 8A is color-reduced by using the RGB values of the representative color of the background attribute shown in 802 of FIG. 8B. It should be noted that the pixel group 801 is pixels excluding pixels corresponding to character regions of "H", "I", "L", and "E" that are indicated by dotted lines in FIG. 8A among the plurality of pixels constituting the original image 400. When the process of the step S703 is completed, the color reduction processing proceeds to a step S705, which will be described below.

In the step S704, the attribute-based color reduction processing unit 304 converts the RGB values of the pixel of interest into RGB values indicating the color set in the attribute-based representative color information 403 as the representative color of the character attribute. Specifically, the attribute-based color reduction processing unit 304 selects a color closest to the pixel of interest among the three colors set in the attribute-based representative color information 403 as the representative color of the character attribute, and converts the RGB values of the pixel of interest into RGB values of the selected color. In the step S704, for example, a color with the smallest difference from the RGB values of the pixel of interest among the three colors, which are the representative color of the character attribute, is selected. It should be noted that this method is merely an example, and for example, the RGB values of the pixel of interest and the RGB values of the representative color of the character attribute may be converted into a color space represented by lightness and hue such as the L*a*b* color space, and which color to select may be determined based on the differences of these values. In this way, the pixels judged to be the character attribute based on the black-and-white binary image 402 among the plurality of pixels constituting the original image 400, for example, a pixel group 803*a*, a pixel group 803*b*, a pixel group 803*c*, and a pixel group 803*d* that are shown in FIG. 8C are color-reduced by using the RGB values of the representative color of the character attribute shown in 804 of FIG. 8D. When the process of the step S704 is completed, the color reduction processing proceeds to the step S705, which will be described below.

In the step S705, the attribute-based color reduction processing unit 304 judges whether or not all the pixels constituting the original image 400 have been selected as the pixel of interest. In the case of being judged in the step S705 that any one of the pixels constituting the original image 400 is not selected as the pixel of interest, the color reduction processing returns to the step S701. In the case of being judged in the step S705 that all the pixels constituting the original image 400 have been selected as the pixel of interest, the color reduction processing ends, and the processing proceeds to a step S605 of FIG. 6.

In the step S605, the data processing unit 215 controls the color information generating unit 305 to generate the color information corresponding to each color included in the color-reduced image 404. It should be noted that as described above, the color information includes the coordinate information indicating that the pixels having the pixel value indicating the corresponding color exist in which range of the color-reduced image 404, and the information indicating the number of the pixels having the pixel value indicating the corresponding color. The generated color information is recorded in the color management information 500.

Next, the data processing unit 215 controls the color information sorting unit 306 to sort the plurality of pieces of color information included in the color management information 500 based on the number of pixels (a step S606). As a result, the sorted color management information 502, in which the color information corresponding to the color with the largest number of pixels is arranged at the top, is generated.

Next, the data processing unit 215 controls the background color data generating unit 307 to output the color information having the top-most arrangement order in the sorted color management information 502 as the background color data (a step S607). Next, the data processing unit 215 controls the binary image generating unit 308 to generate the binary images based on the color-reduced image 404 and the sorted color management information 502 (a step S608). In the step S608, as described above, the binary images of the three colors (for example, black, pale yellow, and red) excluding the background color (for example, white) that is the color having the top-most arrangement order in the sorted color management information 502 are generated, respectively.

Next, the data processing unit 215 controls the binary image compressing unit 309 to perform the compression processing by using the compression method such as the MMR with respect to the three binary images generated in the step S608, respectively, and generate the three pieces of binary image compressed data (a step S609). The binary image compressed data includes MMR-compressed data obtained by compressing the binary image by the MMR, and the color information corresponding to the binary image.

Figure 9:
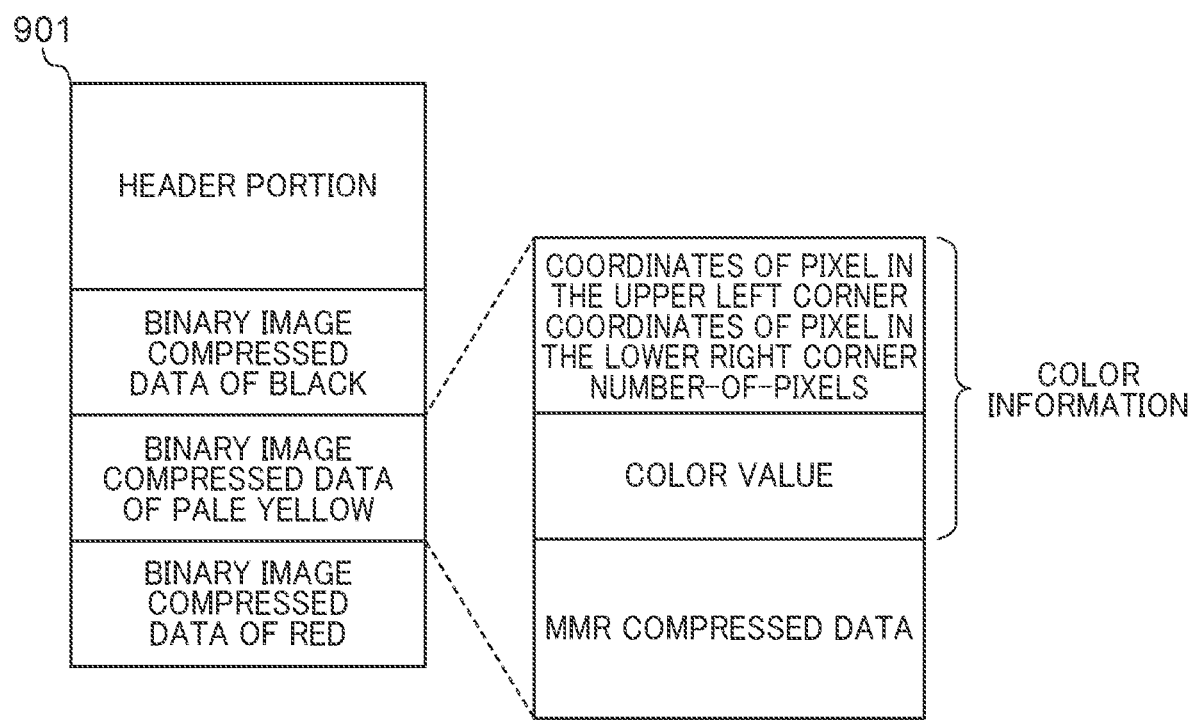
FIG. 9 is a diagram that shows an example of compressed data generated in a step S610 of FIG. 6.

Next, the data processing unit 215 controls the data integrating unit 310 to integrate the background color data and the three pieces of binary image compressed data generated in the step S609 to generate the compressed data 901 shown in FIG. 9 (a step S610), and the small-number-of-colors compression processing ends.

The compressed data 901 includes a header portion and the three pieces of binary image compressed data. The header portion includes information such as the size (the number of pixels in the vertical and horizontal directions) of the original image 400 obtained from the scanner unit 201, a color value of the background color, and the resolution. Here, since the color with the largest number of pixels is basically selected as the background color, for example, in the case that the document is printed on a color paper such as red, the value of red or a reddish color is included as the color value of the background color.

It should be noted that FIG. 9 shows a configuration example of the compressed data in the case that the three pieces of binary image compressed data of black, pale yellow, and red other than the background color are generated in the step S609. For example, in the case that N pieces of binary image compressed data corresponding to colors other than the background color are generated in the step S609, the compressed data includes the N pieces of binary image compressed data. Of course, in the case that the original image obtained from the scanner unit 201 is an image generated by reading a document, on which nothing is drawn on a single-color paper such as a blank sheet, the binary image compressed data will not be generated. Furthermore, in the case that the original image obtained from the scanner unit 201 is an image generated by reading a black-and-white document, one piece of binary image compressed data corresponding to a color other than the background color will be generated. Here, in the case that pixels having RGB values of colors other than the background color are only a part of the original image, since the MMR-compressed data becomes data obtained by compressing only that part, the data size becomes smaller than when the entire original image is compressed by the MMR.

In addition, in decoding of the compressed data 901, a background region corresponding to the size of the original image 400 described in the header portion of the compressed data 901 is rendered with the color value of the background color described in the header portion. In addition, the three pieces of binary image compressed data in the compressed data 901 are sequentially decompressed.

The binary image obtained by decompression is overwritten on the background region in accordance with the position and the color that are indicated by the color information corresponding to the binary image.

As described above, according to the above-described preferred embodiment of the present invention, in the MFP 101, the following processes are executed. First, based on the histogram of the RGB values of the pixels judged to be the background attribute based on the black-and-white binary image 402 among all the pixels constituting the original image 400, the representative color of the background attribute is determined. In addition, based on the histogram of the RGB values of the pixels judged to be the character attribute based on the black-and-white binary image 402 among all the pixels constituting the original image 400, the representative color of the character attribute is determined. In the color reduction processing that generates the color-reduced image, the RGB values of the pixels judged to be the background attribute based on the black-and-white binary image 402 among all the pixels constituting the original image 400 are converted into the RGB values indicating the representative color of the background attribute, and the RGB values of the pixels judged to be the character attribute based on the black-and-white binary image 402 among all the pixels constituting the original image 400 are converted into the RGB values indicating the representative color of the character attribute. As a result, it is possible to prevent the generation of a color-reduced image, in which pixels other than the background region such as some pixels in a handwritten character region are color-reduced to the background color and the character blurring occurs, and it is possible to generate the color-reduced image with high object reproducibility.

In addition, in the above-described preferred embodiment of the present invention, in the case that a plurality of colors are determined as the representative color of the character attribute, in the color reduction processing, the RGB values of the pixels judged to be the character attribute based on the black-and-white binary image 402 are converted into RGB values that indicate the color closest to the color indicated by the RGB values of the pixels judged to be the character attribute based on the black-and-white binary image 402 among the plurality of colors. As a result, it is possible to convert the color of the character region into RGB values of a color that is different from the background color and is close to the color of an actual object, and thus, it is possible to generate a color-reduced image that does not greatly change the impression from the actual object while preventing the occurrence of the character blurring.

In addition, in the above-described preferred embodiment of the present invention, the MFP 101 is an apparatus that includes the scanner unit 201 (a reading unit) that reads a document and generates a scanned image of the document. As a result, when performing the color reduction processing with respect to the scanned image generated by the scanner unit 201, it is possible to generate a color-reduced image with high object reproducibility.

Although the present invention has been described by using the above-described preferred embodiment, the present invention is not limited to the above-described preferred embodiment. For example, a plurality of colors may be determined as the representative color of the background attribute. Specifically, two colors that are a color with the highest frequency and a color with the second highest frequency are determined from the histogram of the RGB values of the background attribute, and two colors that are a color with the highest frequency and a color with the second highest frequency are determined from the histogram of the RGB values of the character attribute. As a result, for example, when performing the color reduction processing with respect to a scanned image obtained by reading a document with a plurality of background colors such as a document with a white background color on its upper side and a light blue background color on its lower side, it is possible to generate a color-reduced image with high object reproducibility.

It should be noted that in the case that the plurality of colors are determined as the representative color of the background attribute, in the step S703, a color closest to the pixel of interest among the two colors set in the attribute-based representative color information 403 as the representative color of the background attribute is selected, and the RGB values of the pixel of interest are converted into RGB values of the selected color. As a result, it is possible to convert the color of the background region into RGB values of a color that is close to the color of an actual object, and thus, it is possible to generate a color-reduced image that does not greatly change the impression from the actual object.

In addition, in the preferred embodiment of the present invention, the black-and-white binary image 402 may be generated by generating divided black-and-white binary images for a plurality of divided gray images obtained by dividing the gray image 401, respectively, and combining all the generated divided black-and-white binary images. In the above-described preferred embodiment of the present invention, the configuration, in which the black and white binary image 402 is generated based on the distribution of the luminance values of the entire gray image 401 and the color-reduced image 404 is generated by using the black and white binary image 402, has been described. However, in the above-described preferred embodiment of the present invention, for example, there is a possibility that characters with a unique color such as a logo of a company are treated in the same way as other characters and that the reproducibility of objects deteriorates depending on the distribution of the luminance values within the gray image.

Figure 10A:
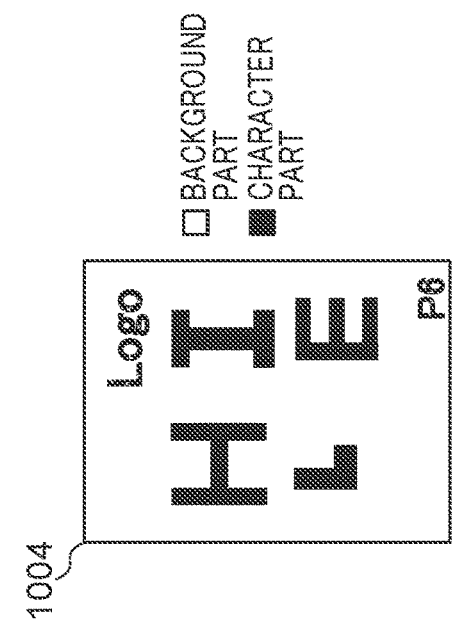
FIGS. 10A, 10B, 10C, 10D, 10E, and 10F are diagrams for explaining a modification of the preferred embodiment of the present invention.
Figure 10B:
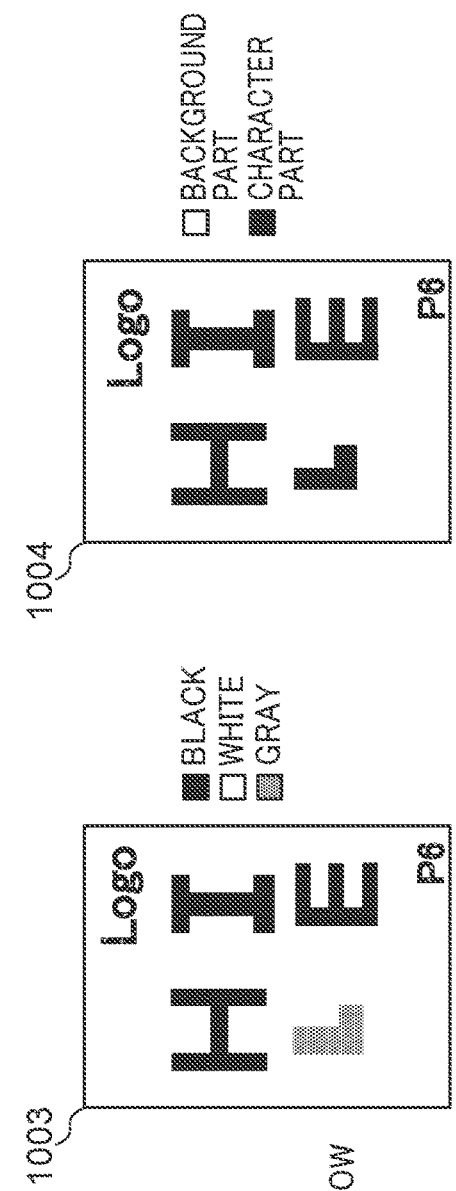
Figure 10C:
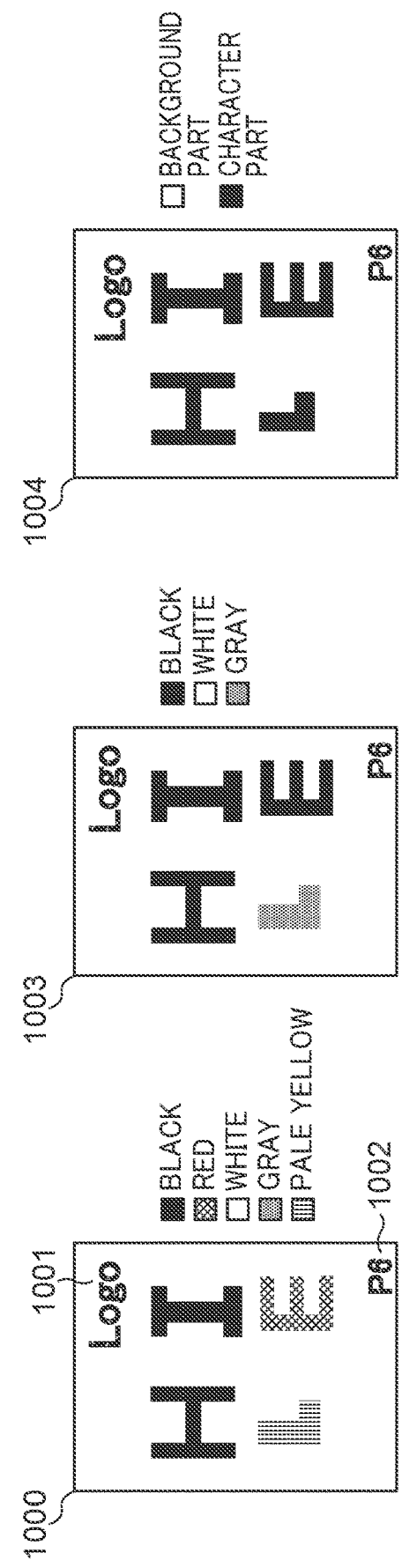

For example, in the case that the data processing unit 215 obtains an original image 1000 shown in FIG. 10A from the scanner unit 201, the gray image generating unit 301 of the data processing unit 215 generates a gray image 1003 shown in FIG. 10B. The original image 1000 is an image that includes a logo 1001 with a unique color in its upper right corner and a page number 1002 with the unique color in its lower right corner. The luminance value distribution characteristic of the upper portion of the original image 1000 is different from the luminance value distribution characteristic of the lower portion of the original image 1000. Similarly, the luminance value distribution characteristic of the upper portion of the gray image 1003 is different from the luminance value distribution characteristic of the lower portion of the gray image 1003. Next, the black-and-white binary image generating unit 302 performs a binarization processing using a distribution of luminance values of the entire gray image 1003 to generate a black-and-white binary image 1004 shown in FIG. 10C. Here, when the above-described binarization processing is performed by using an image such as the gray image 1003 whose upper and lower portions have different luminance value distribution characteristics, for example, an inappropriate processing such that the characters with the unique color are treated in the same way as other characters may be performed. As a result, a black-and-white binary image, in which characters are blurred, such as the black-and-white binary image 1004 shown in FIG. 10C is generated. A color-reduced image generated by performing the color reduction processing by using such the black-and-white binary image 1004 also causes blurring of characters, resulting in a decrease in the object reproducibility.

In order to solve this issue, in the preferred embodiment of the present invention, the black-and-white binary image 402 is generated by generating the divided black-and-white binary images for the plurality of divided gray images obtained by dividing the gray image 401, respectively, and combining all the generated divided black-and-white binary images.

FIG. 11 is a flowchart that shows another procedure of the black-and-white binary image generating processing executed in the step S602 of FIG. 6. The black-and-white binary image combination processing shown in FIG. 11 is executed by the data processing unit 215 in accordance with the instruction received from the CPU 205. It should be noted that in the preferred embodiment of the present invention, as an example, in the step S601 of FIG. 6, it is assumed that the gray image 1003 is generated.

Figure 10D:
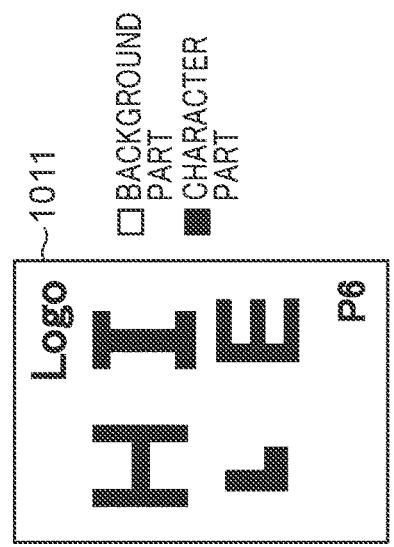
Figure 10E:
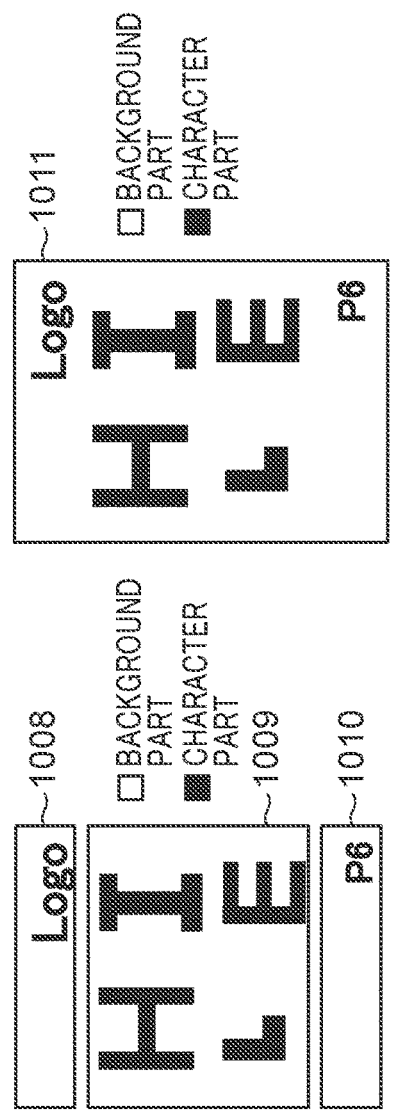

As shown in FIG. 11, first, the data processing unit 215 controls the black-and-white binary image generating unit 302 to divide the gray image 1003 (a step S1101). As for the division method of dividing the gray image, for example, the gray image is divided into an upper portion image area, a central portion image area, and a lower portion image area that are determined in advance by using values stored in the ROM 210. This is because the characters with the unique color such as the logo and the page number are often arranged at the upper portion and the lower portion of the image. By the processing performed in the step S1101, three divided gray images, specifically, an upper portion gray image 1005, a central portion gray image 1006, and a lower portion gray image 1007 that are shown in FIG. 10D are generated.

Next, the data processing unit 215 controls the black-and-white binary image generating unit 302 to generate the divided black-and-white binary images based on luminance value distributions of the divided gray images (a step S1102). Specifically, an upper portion black-and-white binary image 1008 is generated based on the luminance value distribution of the upper portion gray image 1005, a central portion black-and-white binary image 1009 is generated based on the luminance value distribution of the central portion gray image 1006, and a lower portion black-and-white binary image 1010 is generated based on the luminance value distribution of the lower portion gray image 1007. It should be noted that in the step S1102, as in the step S602, "Otsu's binarization" is used as the binarization method.

Figure 10F:
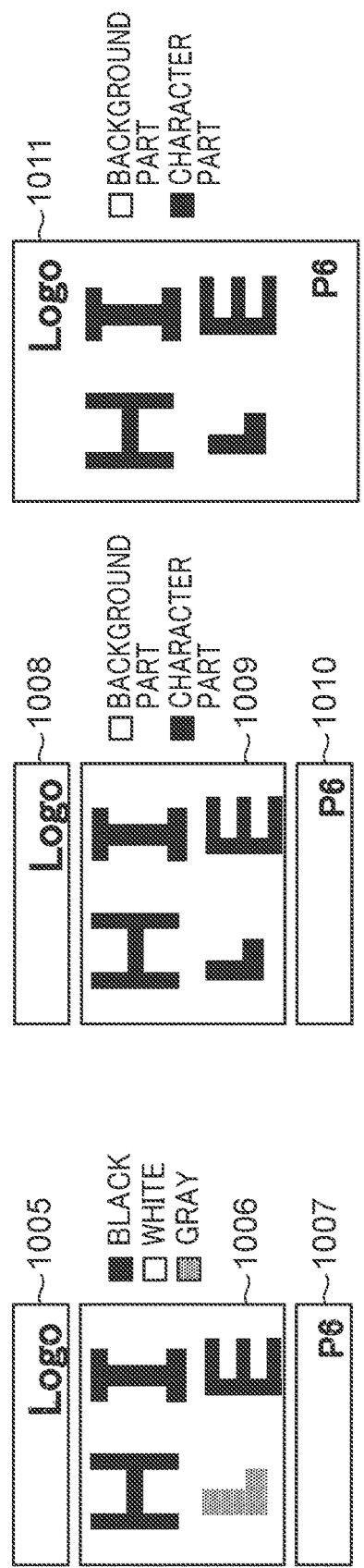

Next, the data processing unit 215 controls the black-and-white binary image generating unit 302 to combine the three divided black-and-white binary images, specifically, the upper portion black-and-white binary image 1008, the central portion black-and-white binary image 1009, and the lower portion black-and-white binary image 1010 (a step S1103). By the processing performed in the step S1103, a black-and-white binary image 1011 shown in FIG. 10F is generated. When the processing of the step S1103 is completed, the processing proceeds to the step S603 described above.

As described above, in the preferred embodiment of the present invention, the black-and-white binary image 1011 is generated by generating the divided black-and-white binary images for the plurality of divided gray images obtained by dividing the gray image 401, respectively, and combining all the generated divided black-and-white binary images. As a result, when performing the color reduction processing with respect to an image with different luminance value distribution characteristics for respective areas, it is possible to generate a color-reduced image by using the black-and-white binary image that takes the luminance value distribution characteristics of the respective areas into account, and thus, it is possible to generate the color-reduced image with high object reproducibility.

In addition, in the preferred embodiment of the present invention, the plurality of divided gray images are the upper portion gray image 1005, the central portion gray image 1006, and the lower portion gray image 1007. As a result, when performing the color reduction processing with respect to an original image, in which areas of the characters with the unique color such as the logo and the page number are arranged at its upper portion and its lower portion, it is possible to generate a color-reduced image with high object reproducibility.

It should be noted that in the preferred embodiment of the present invention, as the division method of dividing the gray image 1003, although the method of dividing the gray image 1003 into the upper portion image area, the central portion image area, and the lower portion image area that are determined in advance by using the values stored in the ROM 210 has been described, the division method of dividing the gray image 1003 is not limited to this method.

For example, in the MFP 101, the data processing unit 215, which functions as an analyzing unit, performs image analysis of the gray image 1003, and then, the data processing unit 215, which functions as an area determining unit, determines divided areas based on an analysis result obtained by the image analysis so as to divide the gray image 1003 into the areas including the characters with the unique color such as the logo and the page number and an area region including other characters. In this way, even by determining areas, into which the gray image is divided, based on the analysis result obtained by the image analysis, it is possible to obtain the same effects as the above-described preferred embodiment of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-131969, filed on Aug. 22, 2022, which is hereby incorporated by reference herein in its entirety.

What is claimed is:

1. An image processing apparatus comprising:
a data processing unit configured or programmed to function as:
a generating unit that generates a binary image for judging whether each of pixels constituting an image obtained is a background attribute or a character attribute;
a first determining unit that determines one or more colors of a first type representative color based on a histogram of RGB values of pixels judged to be the background attribute based on the binary image among all the pixels constituting the image;
a second determining unit that determines one or more colors of a second type representative color based on a histogram of RGB values of pixels judged to be the character attribute based on the binary image among all the pixels constituting the image; and
a color reduction processing unit that performs a color reduction processing with respect to the image to generate a color-reduced image, and
wherein, in the color reduction processing, the RGB values of the pixels judged to be the background attribute based on the binary image among all the pixels constituting the image are converted into RGB values indicating the first type representative color, and the RGB values of the pixels judged to be the character attribute based on the binary image among all the pixels constituting the image are converted into RGB values indicating the second type representative color.

2. The image processing apparatus according to claim 1, wherein, in a case that a plurality of colors are determined as the first type representative color, in the color reduction processing, the RGB values of the pixels judged to be the background attribute based on the binary image are converted into RGB values that indicate a color closest to a color indicated by the RGB values of the pixels judged to be the background attribute based on the binary image among the plurality of colors.

3. The image processing apparatus according to claim 1, wherein, in a case that a plurality of colors are determined as the second type representative color, in the color reduction processing, the RGB values of the pixels judged to be the character attribute based on the binary image are converted into RGB values that indicate a color closest to a color indicated by the RGB values of the pixels judged to be the character attribute based on the binary image among the plurality of colors.

4. The image processing apparatus according to claim 1, wherein the binary image is generated by using a distribution of luminance values of all the pixels constituting the image.

5. The image processing apparatus according to claim 1, wherein the data processing unit is configured or programmed to function as a gray image generating unit that generates a gray image based on the image,
divided binary images are generated for a plurality of divided gray images obtained by dividing the gray image, respectively,
each of the divided binary images is generated by using a distribution of luminance values of all pixels constituting the corresponding divided gray image, and
the binary image is generated by combining all the generated divided binary images.

6. The image processing apparatus according to claim 5, wherein the plurality of divided gray images are an image of an upper portion area of the gray image, an image of a central portion area of the gray image, and an image of a lower portion area of the gray image.

7. The image processing apparatus according to claim 5, wherein the data processing unit is configured or programmed to function as
an analyzing unit that performs image analysis of the gray image; and
an area determining unit that determines areas, into which the gray image is divided, based on an analysis result obtained by the image analysis.

8. The image processing apparatus according to claim 1, wherein the image processing apparatus is a reading apparatus including a reading unit that reads a document and generates an image of the document.

9. A control method for an image processing apparatus, the control method comprising:

a step of generating a binary image for judging whether each of pixels constituting an image obtained is a background attribute or a character attribute;

a step of determining one or more colors of a first type representative color based on a histogram of RGB values of pixels judged to be the background attribute based on the binary image among all the pixels constituting the image;

a step of determining one or more colors of a second type representative color based on a histogram of RGB values of pixels judged to be the character attribute based on the binary image among all the pixels constituting the image; and a step of performing a color reduction processing with respect to the image to generate a color-reduced image, and wherein, in the color reduction processing, the RGB values of the pixels judged to be the background attribute based on the binary image among all the pixels constituting the image are converted into RGB values indicating the first type representative color, and the RGB values of the pixels judged to be the character attribute based on the binary image among all the pixels constituting the image are converted into RGB values indicating the second type representative color.

10. A non-transitory computer-readable storage medium storing a program for causing a computer to execute a control method for an image processing apparatus, the control method comprising:

a step of generating a binary image for judging whether each of pixels constituting an image obtained is a background attribute or a character attribute;

a step of determining one or more colors of a first type representative color based on a histogram of RGB values of pixels judged to be the background attribute based on the binary image among all the pixels constituting the image;

a step of determining one or more colors of a second type representative color based on a histogram of RGB values of pixels judged to be the character attribute based on the binary image among all the pixels constituting the image; and a step of performing a color reduction processing with respect to the image to generate a color-reduced image, and wherein, in the color reduction processing, the RGB values of the pixels judged to be the background attribute based on the binary image among all the pixels constituting the image are converted into RGB values indicating the first type representative color, and the RGB values of the pixels judged to be the character attribute based on the binary image among all the pixels constituting the image are converted into RGB values indicating the second type representative color.

\* \* \* \* \*